(12) United States Patent
Wan et al.

(10) Patent No.: US 11,886,059 B1
(45) Date of Patent: Jan. 30, 2024

(54) DISPLAY APPARATUS, CONTROL CIRCUIT, AND ANTI-PEEPING DISPLAY METHOD

(71) Applicant: HKC CORPORATION LIMITED, Shenzhen (CN)

(72) Inventors: Ye Wan, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/209,463

(22) Filed: Jun. 13, 2023

(30) Foreign Application Priority Data

Oct. 12, 2022 (CN) .......................... 202211245579.9

(51) Int. Cl.
| | |
|---|---|
| *G02F 1/13* | (2006.01) |
| *G02F 1/13357* | (2006.01) |
| *G09G 3/34* | (2006.01) |
| *F21V 14/02* | (2006.01) |

(52) U.S. Cl.
CPC ............ *G02F 1/1323* (2013.01); *F21V 14/02* (2013.01); *G02F 1/133606* (2013.01); *G09G 3/342* (2013.01); *G02F 1/133603* (2013.01); *G09G 2320/068* (2013.01); *G09G 2358/00* (2013.01)

(58) Field of Classification Search
CPC ............ G02F 1/1323; G02F 1/133603; G02F 1/133606; G02F 1/133626; G02F 1/133503; G09G 3/342; G09G 2358/00; G09G 2320/068; G09F 13/30; F21V 14/02
See application file for complete search history.

(56) References Cited

U.S. PATENT DOCUMENTS

| | | | |
|---|---|---|---|
| 2017/0269286 A1 | 9/2017 | Zheng et al. | |
| 2022/0381423 A1* | 12/2022 | Kang | ................. G09F 9/33 |
| 2022/0406229 A1* | 12/2022 | Lee | ................. G09F 19/12 |

FOREIGN PATENT DOCUMENTS

| | | | | |
|---|---|---|---|---|
| CN | 106090728 A | | 11/2016 | |
| CN | 108957853 A | * | 12/2018 | ........... G02F 1/1323 |
| CN | 108957853 A | | 12/2018 | |
| CN | 109164634 A | | 1/2019 | |

(Continued)

OTHER PUBLICATIONS

Notification to Grant Patent Right for Invention, Chinese Application No. 202211245579.9, dated Nov. 18, 2022 (7 pages).

(Continued)

*Primary Examiner* — Erin Kryukova

(57) ABSTRACT

A display apparatus, a control circuit, and an anti-peeping display method are provided. The display apparatus includes a display panel and a backlight module. The anti-peeping display method includes: determining an anti-peeping area; controlling the dimming diaphragm to be alternately switched between a transparent mode and a diffusion mode; in response to the dimming diaphragm being switched to the transparent mode, disabling a part of first light-emitting units rotating into the anti-peeping area from emitting light and enabling a part of second light-emitting units rotating into the anti-peeping area to emit light; and in response to the dimming diaphragm being switched to the diffusion mode, disabling the part of the first light-emitting units rotating into the anti-peeping area to emit light and the part of the second light-emitting units rotating into the anti-peeping area from emitting light.

20 Claims, 8 Drawing Sheets

(56) References Cited

FOREIGN PATENT DOCUMENTS

| CN | 109407408 | A | * | 3/2019 | | |
|---|---|---|---|---|---|---|
| CN | 110032002 | A | * | 7/2019 | ....... | G02F 1/133308 |
| CN | 112068355 | A | * | 12/2020 | | |
| CN | 112068355 | A | | 12/2020 | | |
| CN | 214751240 | U | | 11/2021 | | |
| CN | 115327819 | A | | 11/2022 | | |
| CN | 115327820 | A | | 11/2022 | | |
| JP | 2009048998 | A | | 3/2009 | | |
| WO | WO-2020050847 | A1 | * | 3/2020 | ........... | G02F 1/1323 |

OTHER PUBLICATIONS

International Search Report, International Patent Application No. PCT/CN2023/095381, dated Aug. 28, 2023 (13 pages).

* cited by examiner

DISPLAY APPARATUS, CONTROL CIRCUIT, AND ANTI-PEEPING DISPLAY METHOD

CROSS REFERENCE TO RELATED APPLICATIONS

The present disclosure claims priority to Chinese Patent Application No. 202211245579.9, filed on Oct. 12, 2022 in the National Intellectual Property Administration of China, the contents of which are herein incorporated by reference in their entireties.

TECHNICAL FIELD

The present disclosure relates to the displaying, in particular to a display apparatus, a control circuit, and an anti-peeping display method.

BACKGROUND

Currently, a display panel of a liquid crystal display (LCD) realizes switching of an anti-peeping mode usually by using both a privacy film and an electronically-controlled liquid crystal film cooperated with each other in a backlight module.

Since the existing LCD with a switchable anti-peeping mode uses the privacy film (which enables only collimated light to pass through), a utilization rate of the backlight source is extremely low. Even if the LCD is switched to a non-anti-peeping mode, the light is absorbed by the privacy film in advance and wasted. Even if a partitionable light-emitting-diode (LED) is configured as a backlight source in the backlight module, the display panel cannot achieve high brightness due to the privacy film.

SUMMARY OF THE DISCLOSURE

A first technical solution adopted by the present disclosure is to provide an anti-peeping display method for a display apparatus. The display apparatus includes a display panel and a backlight module. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate; wherein, the anti-peeping display method includes: determining an anti-peeping area; controlling the dimming diaphragm to be alternately switched between the transparent mode and the diffusion mode; in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light.

A second technical solution adopted by the present disclosure is to provide a control circuit for implementing anti-peeping display of a display apparatus. The display apparatus includes a display panel and a backlight module. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate; the control circuit including: a display control module, configured to receive an image signal and control the display panel to display an image according to the image signal; wherein, the control circuit further includes: an anti-peeping module, configured to perform following operations: receiving an anti-peeping signal, and determining an anti-peeping area; controlling the dimming diaphragm to be alternately switched between the transparent mode and the diffusion mode; in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light.

A third technical solution adopted by the present disclosure is to provide a display apparatus, including: a display panel, a backlight module, and the above-mentioned control circuit. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate.

BRIEF DESCRIPTION OF THE DRAWINGS

In order to more clearly illustrate technical solutions in embodiments of the disclosure, a brief description of the drawings required in the description of the embodiments will be given below. Obviously, the drawings described below are only some embodiments of the present disclosure, and other drawings can be obtained by those skilled in the art according to these drawings without any creative work.

Figure 1:
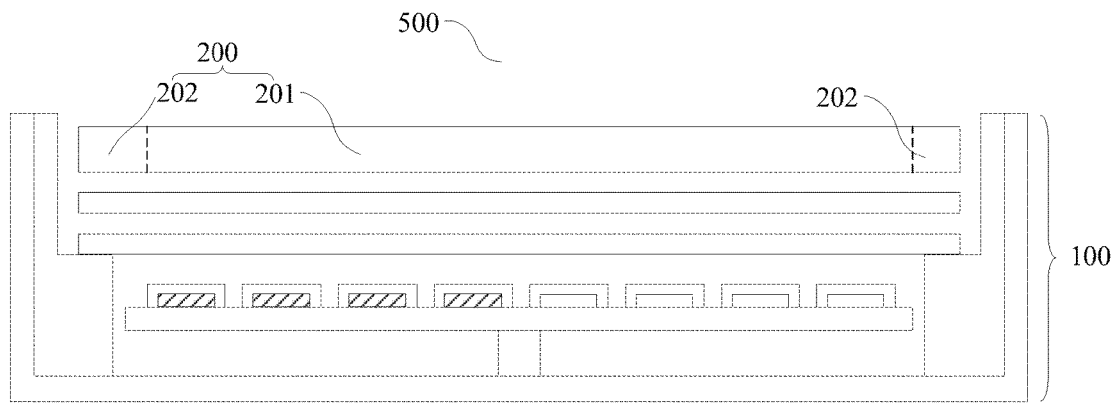
FIG. 1 is a schematic structural view of a display apparatus provided by some embodiments of the present disclosure.

REFERENCE NUMBERS IN THE DRAWINGS 100, backlight module; 1, back plate; 11, side plate; 12, bottom plate; 2, light bar; 21, circuit board; 22, first light-emitting unit; 221, first light-emitting component; 222, diffusion layer; 23, second light-emitting unit; 231, second light-emitting component; 232, prism layer; 24, circular rotation area; R, radius; L, center distance; 3, dimming diaphragm; 4, driving assembly; 41, servo motor; 42, gear set; 421, first gear; 422, second gear; X, central point connecting line; Y, mid-perpendicular; 5, support element; 51, stepped portion; 6, support plate; 200, display panel; 201, display area; A, corner; 202, non-display area; 300, control circuit; 301, display control module; 302, anti-peeping module; 400, storage medium; 401, program file; 500, display apparatus.

DETAILED DESCRIPTIONS

The technical solutions of the embodiments of the present disclosure will be described in detail below in conjunction with the accompanying drawings.

In the following description, for purposes of illustration rather than limitation, specific details, such as specific system architectures, interfaces, and techniques, are set forth in order to provide a thorough understanding of the present disclosure.

The following will clearly and completely describe the technical solutions in the embodiments of the present disclosure in conjunction with the accompanying drawings in the embodiments of the present disclosure. Obviously, the described embodiments are only part of the embodiments of the present disclosure, not all of them. Based on the embodiments of the present disclosure, all other embodiments acquired by those skilled in the art without creative work shall fall within the scope of protection in the present disclosure.

The terms "first", "second", and "third" in the present disclosure are used for descriptive purposes only, and cannot be understood as indicating or implying relative importance or implicitly specifying the quantity of indicated technical features. Thus, features defined as "first", "second", and "third" may explicitly or implicitly include at least one of these features. In the description of the present disclosure, "a plurality of" means at least two, such as two, three, etc., unless otherwise specifically defined. All directional indications (such as up, down, left, right, front, back . . . ) in the embodiments of the present disclosure are only used to explain the relative positional relationships, movements, etc., of components in a certain posture (as shown in the figure), and if the specific posture is changed, the directional indications are also changed accordingly. Furthermore, the terms "include", "have", and any variations thereof, are intended to cover a non-exclusive inclusion. For example, a process, method, system, product, or device including a series of operations or units is not limited to the listed operations or units, but optionally also includes unlisted operations or units, or optionally further includes other operations or units inherent in the process, method, product, or device.

Reference to "embodiment" in the present disclosure means that, specific features, structures, or characteristics described in conjunction with the embodiments may be included in at least one embodiment of the present disclosure. The presence of the phrase at each location in the specification does not necessarily refer to the same embodiment, nor is it a separate or alternative embodiment that is mutually exclusive with other embodiments. It is understood, both explicitly and implicitly, by those skilled in the art that embodiments described herein may be combined with other embodiments.

As shown in FIG. 1, FIG. 1 is a schematic structural view of a display apparatus provided by some embodiments of the present disclosure.

Some embodiments of the present disclosure provide a display apparatus 500. The display apparatus 500 includes a display panel 200 and a backlight module 100. The display panel 200 may be disposed opposite to or facing the backlight module 100. The backlight module 100 may be configured to provide backlight for the display panel 200. In some embodiments, the backlight module 100 may be a direct backlight module.

The display panel 200 may be a liquid crystal panel, and the display panel 200 further has a display area 201 and a non-display area 202. For example, the non-display area 202 may surround a periphery of the display area 201, or may be arranged on only one side of the display area 201. Structures such as a pixel, a driving circuit, a data signal line, a scanning signal line, or the like, may be arranged in the display area 201. Structures such as a scanning circuit, a testing circuit, or the like, may be arranged in the non-display area 202.

In some embodiments, the display apparatus 500 may further include a control circuit (not shown in FIG. 1). The control circuit may be configured to realize the local dynamic anti-peeping display of the display apparatus 500.

In some embodiments, the display panel may include a display area, and a plurality of circular rotation areas of a plurality of light bars jointly cover the entire display area of the display panel.

In some embodiments, the display area may be in shape of a rectangle, and a distance, between a center of one light bar at a corner of the rectangle and the vertex at the corresponding corner of the rectangle, may be substantially equal to the radius of each of the plurality of circular rotation areas.

Figure 2:
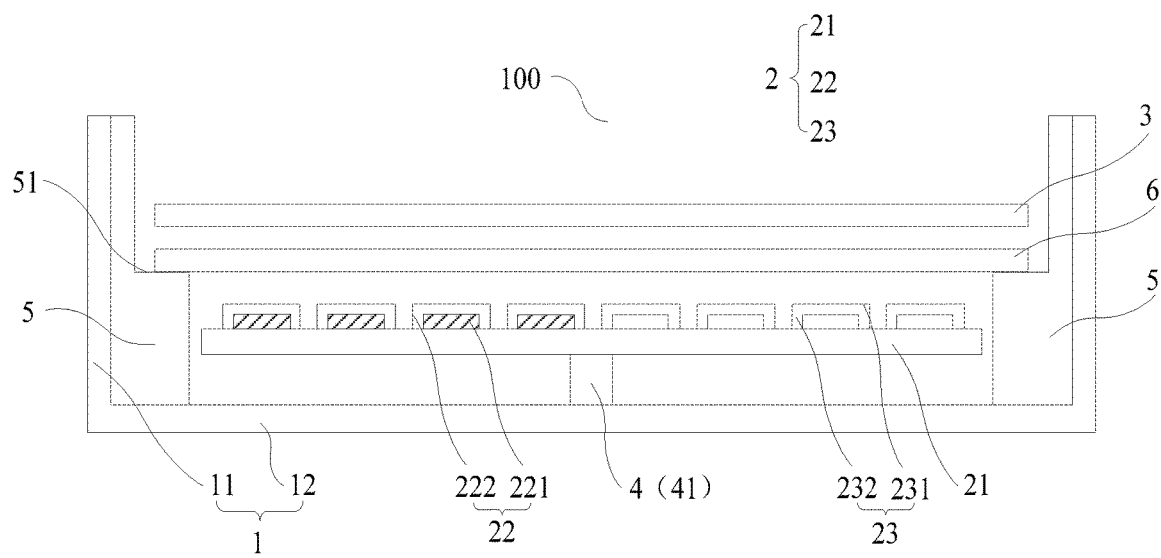
FIG. 2 is a schematic structural view of a backlight module provided by some embodiments of the present disclosure.
Figure 3:
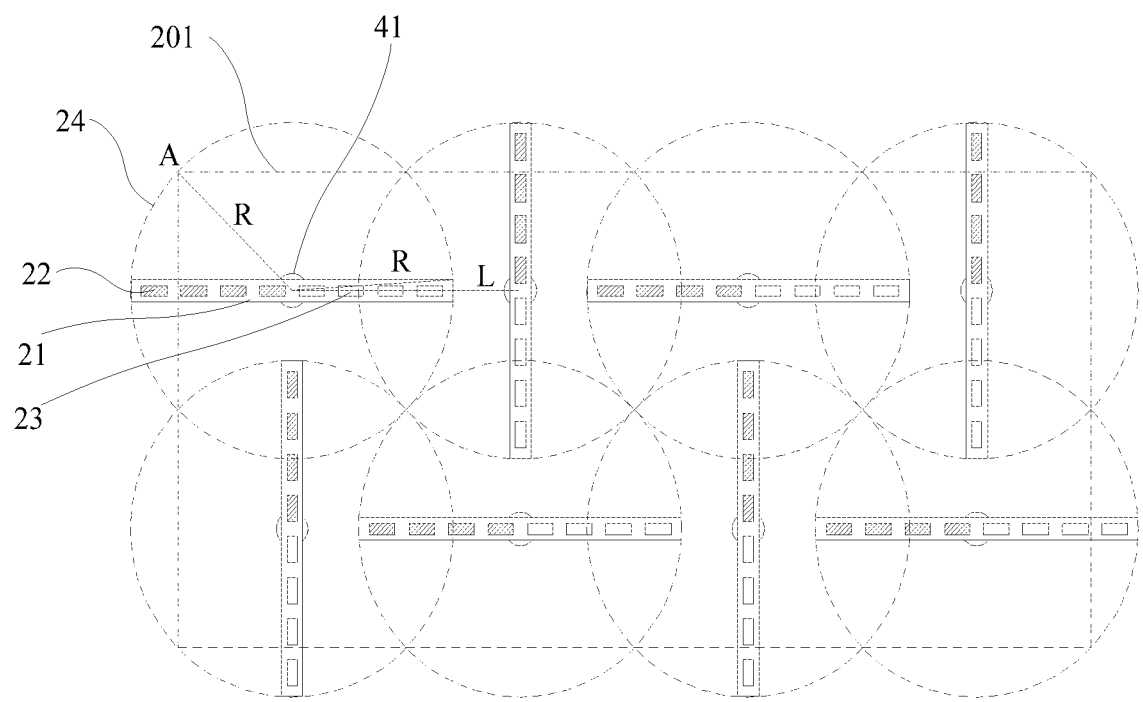
FIG. 3 is a schematic structural view illustrating a configuration of a light bar and a driving assembly provided by a first embodiment of the present disclosure.

As shown in FIG. 2 and FIG. 3, FIG. 2 is a schematic structural view of a backlight module provided by some embodiments of the present disclosure. FIG. 3 is a schematic structural view illustrating a configuration of a light bar and a driving assembly provided by a first embodiment of the present disclosure.

Some embodiments of the present disclosure provide a backlight module 100. The backlight module 100 may include a back plate 1, a light bar 2, a dimming diaphragm 3, and a driving assembly 4. The back plate 1 includes a bottom plate 12, and the light bar 2 may be disposed on one side of the bottom plate 12. The dimming diaphragm 3 may be disposed on a side of the light bar 2 away from the bottom plate 12. The driving assembly 4 may be disposed on the bottom plate 12, connected to the light bar 2, and configured to drive the light bar 2 to rotate.

In some embodiments, the back plate 1 may further include a side plate 11. The side plate 11 may be connected to the bottom plate 12 and integrated with the bottom plate 12. The side plate 11 may be disposed on the side, facing the light bar 2, of the bottom plate 12. In other embodiments, the back plate 1 may only include the bottom plate 12, which may be designed according to actual requirements, and no limitation is set here.

The light bar 2 may include a circuit board 21, a plurality of first light-emitting units 22, and a plurality of second light-emitting units 23. The plurality of first light-emitting units 22 and the plurality of second light-emitting units 23 are arranged on the circuit board 21. One light bar 2 corresponds to one circuit board 21. The first light-emitting unit 22 may be configured to generate diffuse light, and the second light-emitting unit 23 may be configured to generate collimated light. The first light-emitting unit 22 may include a first light-emitting component 221 and a diffusion layer 222. The first light-emitting component 221 may be disposed on one side, away from the bottom plate 12, of the circuit board 21. The diffusion layer 222 may cover the first light-emitting component 221. The diffusion layer 222 may be configured to convert the light emitted by the first light-emitting component 221 into the diffuse light. The second light-emitting unit 23 may include a second light-emitting component 231 and a prism layer 232. The second light-emitting component 231 may be disposed on the side, away from the bottom plate 12, of the circuit board 21. The prism layer 232 may cover the second light-emitting component 231. The prism layer 232 may be configured to convert the light emitted by the second light-emitting component 231 into the collimated light. The circuit board 21 may be configured to control or enable the first light-emitting component 221 and the second light-emitting component 231 to emit light. In some embodiments, the diffusion layer 222 may be a diffusion coating. The prism layer 232 may be a light-concentrating prism. In other embodiments, the diffusion layer 222 and the prism layer 232 may be made of other materials, as long as the diffusion layer 222 may convert the light emitted by the first light-emitting component 221 into the diffuse light and the prism layer 232 may convert the light emitted by the second light-emitting component 231 into the collimated light. The first light-emitting component 221 and/or the second light-emitting component 231 may be a cold cathode fluorescent lamp, or may be a light-emitting diode (LED), which is not limited here. That is, at least one of the first light-emitting component 221 and the second light-emitting component 231 may be a cold cathode fluorescent lamp, or may be a light-emitting diode (LED). In some embodiments, both the first light-emitting component 221 and the second light-emitting component 231 are LEDs. The first light-emitting component 221 and the second light-emitting component 231 may be arranged substantially perpendicular to the circuit board 21, which refers to that a central axis of the first light-emitting component 221 may be arranged substantially perpendicular to the circuit board 21 herein. In other embodiments, the first light-emitting component 221 and the second light-emitting component 231 may be arranged at a certain angle from the circuit board 21, which may be designed according to actual requirements, and no limitation is set here.

It should be understood that the term "and/or" in the present disclosure only represents an association relationship describing the associated objects, and there can be three kinds of relationships. For example, "A and/or B" includes three situations: A exists alone, A and B exist simultaneously, and B exists alone.

For the same light bar 2, the number of the first light-emitting units 22 may be approximately equal to the number of the second light emitting units 23. The first light-emitting units 22 and the second light-emitting units 23 may be spaced apart from each other or in contact with each other. In some embodiments, the first light-emitting units 22 and the second light-emitting units 23 are spaced apart from each other, which helps to deduce a process difficulty of preparation of the diffusion layer 222 and the prism layer 232. The plurality of first light-emitting units 22 and the plurality of second light-emitting units 23 of the same light bar 2 are arranged in at least one row. That is, the plurality of first light-emitting units 22 and the plurality of second light-emitting units 23 may be arranged in one or more rows.

In some embodiments, a plurality of light bars 2 are provided, and the plurality of first light-emitting units 22 and the plurality of second light-emitting units 23 of each light bar 2 are arranged in one row, and the first light-emitting units 22 and the second light-emitting units 23 are respectively arranged on two opposite sides of a central axis of the light bar 2. A rotation frequency of the light bar 2 is greater than or approximately equal to 20 Hz, which may ensure light-emitting uniformity of the display panel 200.

Figure 4A:
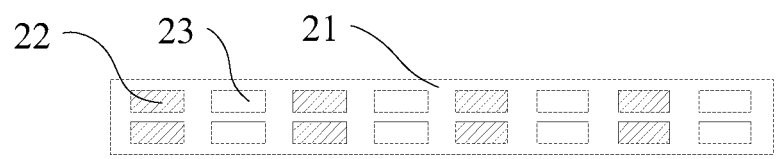
FIG. 4a is a schematic structural view of a first implementation of the light bar provided by the present disclosure.
Figure 4B:
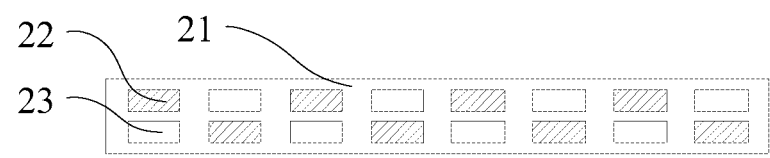
FIG. 4b is a schematic structural view of a second implementation of the light bar provided by the present disclosure.
Figure 4C:
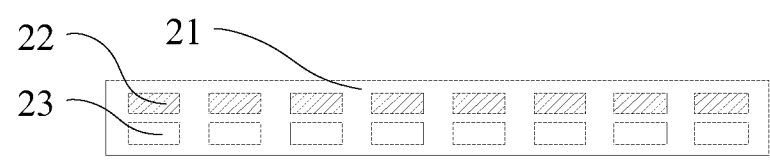
FIG. 4c is a schematic structural view of a third implementation of the light bar provided the present disclosure.
Figure 4D:
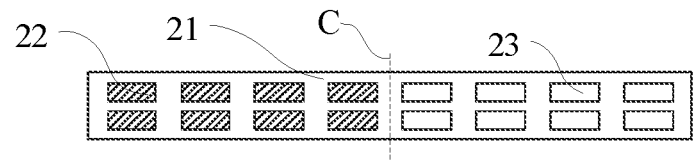
FIG. 4d is a schematic structural view of a fourth implementation of the light bar provided by the present disclosure.
Figure 4E:
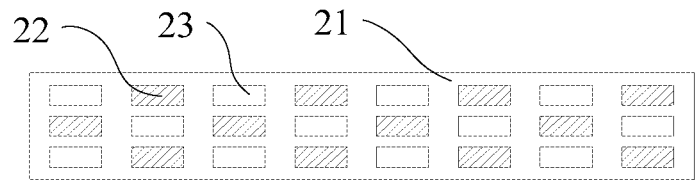
FIG. 4e is a schematic structural view of the light bar a fifth implementation of provided by the present disclosure.
Figure 4F:
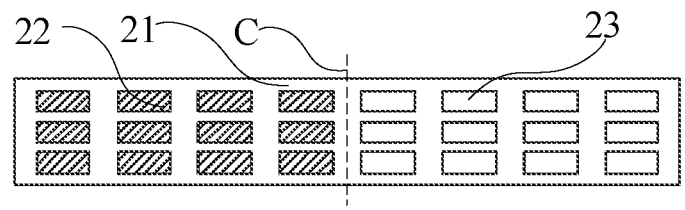
FIG. 4f is a schematic structural view of a sixth implementation of the light bar provided by the present disclosure.
Figure 4G:
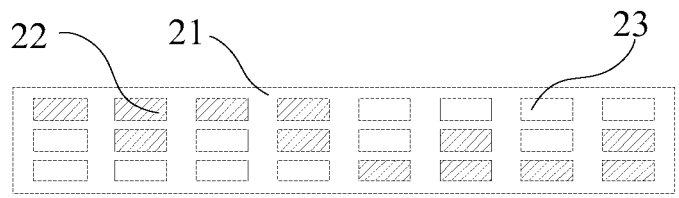
FIG. 4g is a schematic structural view of a seventh implementation of the light bar provided by the present disclosure.
Figure 4H:
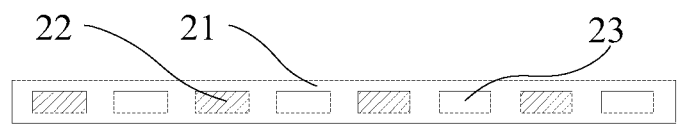
FIG. 4h is a schematic structural view of an eighth implementation of the light bar provided by the present disclosure.

As shown in FIG. 4a to FIG. 4h, FIG. 4a is a schematic structural view of a first implementation of the light bar provided by the present disclosure. FIG. 4b is a schematic structural view of a second implementation of the light bar provided by the present disclosure. FIG. 4c is a schematic structural view of a third implementation of the light bar provided by the present disclosure. FIG. 4d is a schematic structural view of a fourth implementation of the light bar provided by the present disclosure. FIG. 4e is a schematic structural view of the light bar a fifth implementation of provided by the present disclosure. FIG. 4f is a schematic structural view of a sixth implementation of the light bar provided by the present disclosure. FIG. 4g is a schematic structural view of a seventh implementation of the light bar provided by the present disclosure. FIG. 4h is a schematic structural view of an eighth implementation of the light bar provided by the present disclosure.

In some embodiments, as shown in FIG. 4h, the plurality of first light-emitting units 22 and the plurality of second light-emitting units 23 of the same light bar 2 may be arranged in a row, and the first light-emitting units 22 and the second light-emitting units 23 may be arranged along an extension direction of the light bar 2 alternately and in sequence. In some embodiments, as shown in FIG. 4c, the plurality of first light-emitting units 22 and the plurality of second light-emitting units 23 of the same light bar 2 may also be arranged in multiple rows, and one row of the light bar 2 may include only the first light-emitting units 22 or only the second light-emitting units 23, that is, the plurality of first light-emitting units 22 are arranged in one row, and the plurality of second light-emitting units 23 are arranged in another row; and/or, as shown in FIG. 4d and FIG. 4f, one row may include both the first light-emitting units 22 and the second light-emitting units 23, the number of the first light-emitting units 22 is the same as the number of the second light emitting unit 23 in each row, and the first light-emitting units 22 and the second light-emitting units 23 may be respectively arranged on two opposite sides of the central axis C of the light bar 2. In some embodiments, as shown in FIG. 4a, FIG. 4b and FIG. 4e, the first light-emitting units 22 and the second light-emitting units 23 may be arranged alternately and in sequence along the extending direction of the light bar 2 and/or along a direction substantially perpendicular to the extending direction of the light bar 2. In some embodiments, as shown in FIG. 4g, the plurality of first light-emitting units 22 and the plurality of second light-emitting units 23 of the same light bar 2 may be arranged in multiple rows, such as three rows; the number of the first light-emitting units 22 is the same as the number of the second light emitting unit 23 in each row; in some rows, the first light-emitting units 22 and the second light-emitting units 23 may be respectively arranged on two opposite sides of the central axis C of the light bar 2; and in other rows, the first light-emitting units 22 and the second light-emitting units 23 may be arranged alternately and in sequence along the extending direction of the light bar 2 and/or along a direction substantially perpendicular to the extending direction of the light bar 2. It should be noted that the embodiments of the present disclosure only show some examples, which does not mean that the structure of the light bar 2 is limited thereto. In some embodiments, the plurality of first light-emitting units 22 and the plurality of second light-emitting units 23 of the same light bar 2 may be arranged in two rows, and the rotation frequency of the light bar 2 may be greater than or approximately equal to 10 Hz.

The driving assembly 4 may be disposed between the bottom plate 12 and the circuit board 21 and connected to the circuit board 21. The driving assembly may be configured to drive the light bar 2 to rotate on a plane which is substantially parallel to the bottom plate 12. In some embodiments, the driving assembly 4 may pass through the bottom plate 12 and be connected to the circuit board 21, or the driving assembly 4 may be arranged at other places, which may be designed according to actual requirements, and no limitation is set here.

The driving assembly 4 may be configured to drive the light bar 2 to rotate around a center of the light bar 2 to form a circular rotation area 24. That is, the circular rotation area 24 centered in the center of the light bar 2, the radius of the circular rotation area 24 is R, and the radius R of the circular rotation area 24 is equal to the farthest distance from the center of the light bar 2 to an end of the light bar 2. The circular rotation areas of two adjacent light bars 2 are partially overlapped with each other and rotation phases of the two adjacent light bars 2 are not synchronized or out of synchronization in order to reduce mutual interference between the two adjacent light bars 2. A plurality of circular rotation areas 24 jointly cover the entire display area 201 of the display panel 200. In some embodiments, multiple light bars 2 are provided, and the display area 201 may be in shape of a rectangle, the distance between the center of the light bar 2 at the corner A of the rectangle and the apex of the corner A of the rectangle is equal to the radius R of the circular rotation area 24. The adjacent light bars 2 are approximately perpendicular to each other, that is, in response to the light bars 2 rotating at the same time, the rotation phase difference between the adjacent light bars 2 is $\pi/2$, and the distance L between the centers of the adjacent light bars 2 is equal to $\sqrt{2}R$. In this way, it is possible to not only ensure that the light bars 2 do not interfere with each other when rotating, but also ensure that the plurality of circular rotation areas 24 jointly cover the entire display area 201 of the display panel 200 in the case that the number of light bars 2 is reduced, in order to ensure the light-emitting uniformity in the display area 201.

In some embodiments, the driving assembly 4 may include a plurality of servo motors 41. The plurality of servo motors 41 are connected to the plurality of light bars 2 in one-to-one correspondence, and the servo motors 41 drive the light bars 2 to rotate. The servo motors 41 are arranged between the bottom plate 12 and the circuit board 21, connected to the circuit board 21, and arranged at the center of the circuit board 21, that is, the center of each servo motor 41 coincides with the center of the corresponding one of the light bars 2, so as to better control the rotation frequency of the light bars 2, and further make the rotation frequency of the plurality of light bars 2 consistent with each other, which improves the light-emitting uniformity of the display panel 200. It should be understood that in case that the number of the light bar 2 is one, the number of the servo motor 41 is also one.

Figure 5:
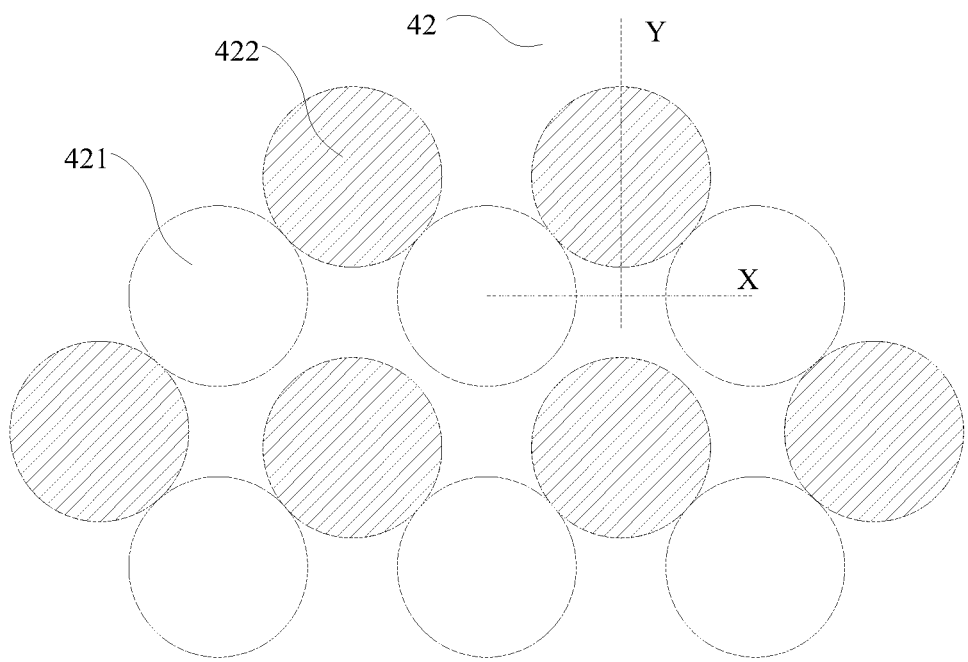
FIG. 5 is a schematic structural view of a gear set provided by some embodiments of the present disclosure.

As shown in FIG. 5, FIG. 5 is a schematic structural view of a gear set provided by some embodiments of the present disclosure.

In some embodiments, the driving assembly 4 may include a servo motor 41 and a gear set 42. The gear set 42 may be connected to the servo motor 41 and the plurality of light bars 2. The servo motor 41 may be configured to drive the gear set 42 to rotate, and the gear set 42 may be configured to drive the plurality of light bars 2 to rotate. The gear set 42 includes a plurality of first gears 421 and a plurality of second gears 422. The first gears 421 and the second gears 422 are disposed between the circuit board 21 and the back plate 1 and connected to the circuit board 21. The number of the servo motor 41 may be one, and the servo motor 41 is capable to drive one first gear 421 or one second gear 422 to rotate. Each first gear 421 is arranged corresponding to a corresponding one of the light bars 2, and the center of the first gear 421 coincides with the center of the light bar 2. The first gears 421 and the second gears 422 mesh with or are engaged with each other. The first gears 421 have the same configurations as the second gears 422, but the first gears 421 are arranged in different positions from positions of the second gears 422, to ensure that all the first gears 421 are able to rotate at a uniform speed, so that the rotation frequencies of the plurality of light bars 2 are consistent with each other. One second gear 422 is arranged on the mid-perpendicular Y of a connecting line X connecting central points of two adjacent first gears 421. In some embodiments, one second gear 422 is provided on the mid-perpendicular Y of the connecting line X connecting central points of two adjacent first gears 421, and the central point of the second gear 422 is not located on (i.e., is located out of) the connecting line X connecting the central points of two adjacent first gears 421. Compared with the embodiment in which the driving assembly 4 includes the servo motor 41, in this case, the light bars 2 are driven to rotate by gears, which is capable to ensure that the rotation speeds of the light bars 2 are consistent with each other, and thus the light-emitting uniformity of the display panel 200 may be improved. In other embodiments, the central point of the second gear 422 may be located on the connecting line X connecting the central points of two adjacent first gears 421. It should be noted that the number and arrangement of the first gears 421 and the second gears 422 are not limited, as long as ensuring that the plurality of light bars 2 are able to rotate simultaneously by using one servo motor 41 cooperating with the first gears 421 and the second gears 422.

The dimming diaphragm 3 may be disposed on the side of the light bar(s) 2 away from the bottom plate 12 and spaced apart from the light bar(s) 2. The dimming diaphragm 3 has a diffusion mode and a transparent mode. In the transparent mode, only the collimated light is allowed to pass through the dimming diaphragm 3 and be transmitted to the display panel 200; in the diffusion mode, the diffuse light may pass through the dimming diaphragm 3 and be transmitted to the display panel 200. Positions of the first light-emitting units 22 and the second light-emitting units 23 may be changed continuously as the light bar(s) 2 rotates, and light-emitting conditions of the first light-emitting units 22 and the second light-emitting units 23 may be adjusted according to the mode to which the dimming diaphragm 3 is switched, so that the area of the display panel 200 where the collimated light is transmitted is capable to be changed, so as to realize the local dynamic anti-peeping on the display panel 200. The mode-switching speed of the dimming diaphragm 3 is related to the rotation frequency of the light bar(s) 2, the faster the light bar(s) 2 rotates, the faster the mode-switching speed of the dimming diaphragm 3. The fewer rows the plurality of first light-emitting units 22 and the plurality of second light-emitting units 23 of each light bar 2 are arranged in, the faster the light bar(s) 2 rotates.

In some embodiments, the plurality of first light-emitting units 22 and the plurality of second light-emitting units 23 of each light bar 2 are arranged in one row, and the number of the first light emitting units 22 is approximately equal to the number of the second light emitting units 23. The rotation frequency of the light bar(s) 2 is greater than or approximately equal to 20 Hz. The modes of the dimming diaphragm 3 may be switched at least 20 times per second.

In some embodiments, the plurality of first light-emitting units 22 and the plurality of second light-emitting units 23 of each light bar 2 are arranged in two rows, and the rotation frequency of the light bar(s) 2 is greater than or approximately equal to 10 Hz. The mode of the dimming diaphragm 3 may be switched at least 10 times per second.

The backlight module 100 further includes a support element 5 and a support plate 6. The support plate 6 may be disposed between the dimming diaphragm 3 and the light bar 2, and may be spaced apart from the dimming diaphragm 3. The support element 5 may be arranged on an inner side of the side plate 11 and abuts against the side of the bottom plate 12 close to the light bar 2. The support plate 6 is arranged on one end of the support element 5 away from the bottom plate 12. The support element 5 may be configured to support the support plate 6, which provides the possibility of ensuring that a fixed gap exists between the support plate 6 and the light bar 2 and not to interfere with the rotation of the light bar 2. The support plate 6 may be a transparent support plate 6. The support plate 6 may be made of glass, the support plate 6 may also include glass and stencils, or other materials, which are not limited here. In some embodiments, the side of the support element 5 close to the light bar 2 has a stepped portion 51. One end of the support plate 6 may be arranged or rested on an end surface of the stepped portion 51 which is substantially parallel to the bottom plate 12. In other embodiments, the support element 5 may be in other shapes, as long as ensuring that a gap exists between the support plate 6 and the light bar 2 and the rotation of the light bar 2 is not interfered.

Figure 6:
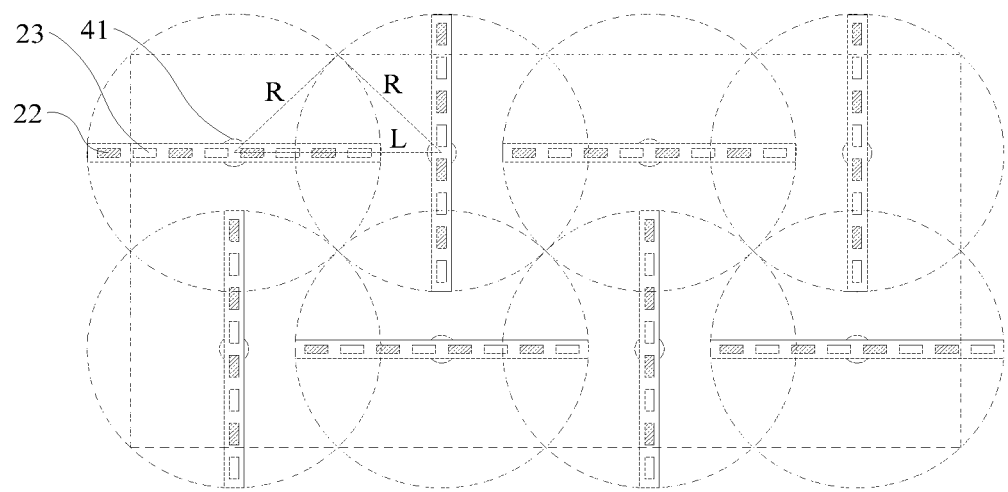
FIG. 6 is a schematic structural view illustrating a configuration of the light bar and the driving assembly provided by a second embodiment of the present disclosure.

As shown in FIG. 3 and FIG. 6, FIG. 6 is a schematic structural view illustrating a configuration of the light bar and the driving assembly provided by a second embodiment of the present disclosure.

The configuration of the light bar(s) 2 and the driving assembly 4 provided by the second embodiment of the present disclosure is substantially the same as that of the light bar(s) 2 and the driving assembly 4 provided by the first embodiment of the present disclosure, except that the first light-emitting units 22 and the second light-emitting units 23 of the same light bar 2 are arranged alternately in sequence along the extending direction of the light bar 2 in the second embodiment.

In some embodiments, the first light-emitting units 22 and the second light-emitting units 23 of the same light bar 2 are arranged alternately in sequence along the extending direction of the light bar 2. The rotation frequency of the light bar 2 is greater than or approximately equal to 10 Hz. Compared with the light bar(s) 2 and the driving assembly 4 provided by the first embodiment of the present disclosure, the stability of the light bar(s) 2 during the rotation in the second embodiment is better, and the light-emitting uniformity of the display panel 200 is better.

Figure 7:
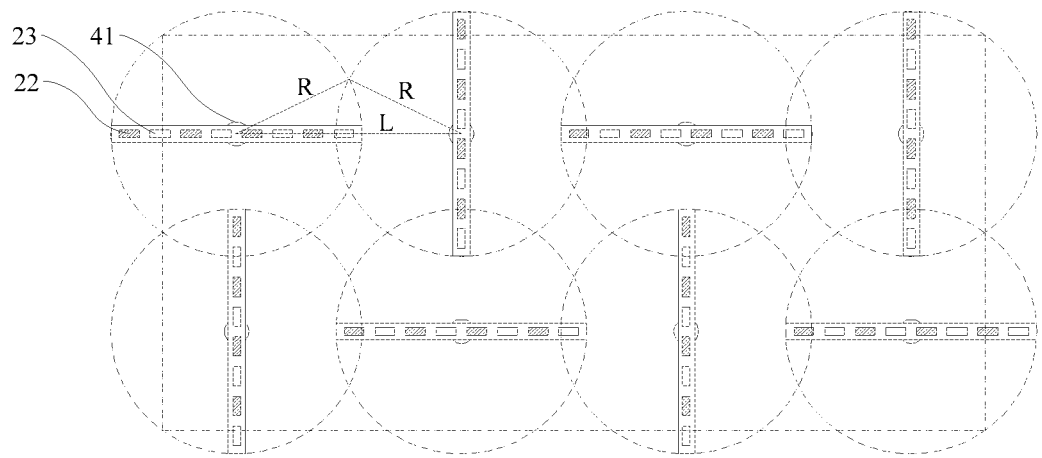
FIG. 7 is a schematic structural view illustrating a configuration of the light bar and the driving assembly provided by a third embodiment of the present disclosure.

As shown in FIG. 6 and FIG. 7, FIG. 7 is a schematic structural view illustrating a configuration of the light bar and the driving assembly provided by a third embodiment of the present disclosure.

The configuration of the light bar(s) 2 and the driving assembly 4 provided by the third embodiment of the present disclosure is substantially the same as that of the light bar(s) 2 and the driving assembly 4 provided by the second embodiment of the present disclosure, and the difference between these two embodiments is that the distance L between the centers of the adjacent light bars 2 in FIG. 6 is approximately equal to $\sqrt{2}R$, and the distance L between the centers of the adjacent light bars 2 in FIG. 7 is greater than $\sqrt{2}R$.

In some embodiments, a plurality of light bars 2 are provided. In case that adjacent light bars 2 are substantially perpendicular to each other, the distance between the centers of the two adjacent light bars 2 is L, the distance L between the centers of the two adjacent light bars 2 is greater than $\sqrt{2}R$, and the plurality of circular rotation areas 24 cannot completely cover the entire display area 201 of the display panel 200, the first light-emitting units 22 and the second light-emitting units 23 need to be arranged at a certain angle from the circuit board 21, to supply fill-in light to the display area 201 which is not covered by the circular rotation area 24, so as to ensure the proper and normal display of the display panel 200. Compared with the light bars 2 and the driving assembly 4 provided by the second embodiment of the present disclosure, the accuracy required for the distance between the light bars 2 in the third embodiment is lower, and the manufacturing process of the backlight module is simpler.

Figure 8:
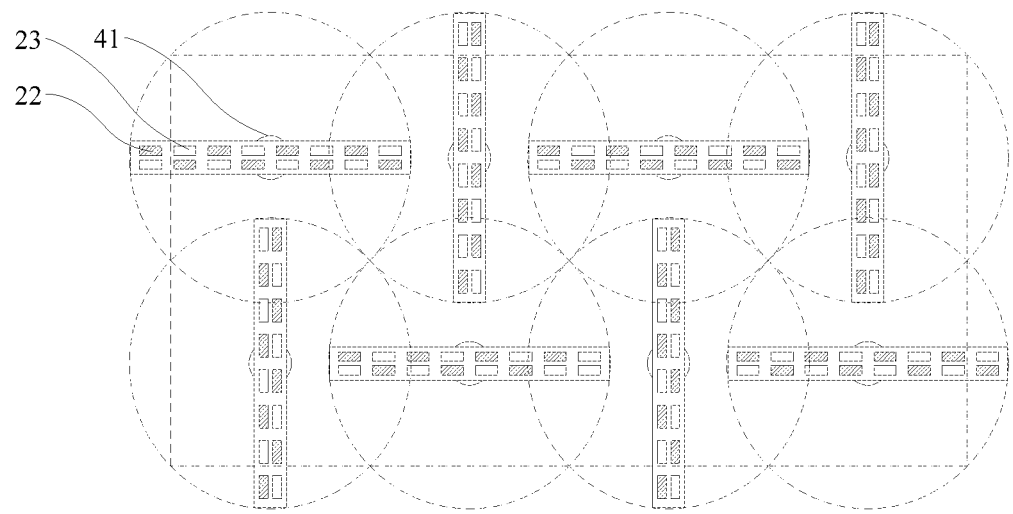
FIG. 8 is a schematic structural view illustrating a configuration of the light bar and the driving assembly provided by a fourth embodiment of the present disclosure.

As shown in FIG. 6 and FIG. 8, FIG. 8 is a schematic structural view illustrating a configuration of the light bar and the driving assembly provided by a fourth embodiment of the present disclosure.

The configuration of the light bar(s) 2 and the driving assembly 4 provided by the fourth embodiment of this disclosure is substantially the same as that of the light bar(s) 2 and the driving assembly 4 provided by the second embodiment of the present disclosure, and the difference between these two embodiments is that in the fourth embodiment, the first light-emitting units 22 and the second light-emitting units 23 of the same light bar are arranged in two rows.

In some embodiments, the first light-emitting units 22 and the second light-emitting units 23 of the same light bar 2 are arranged in two rows. In each row, the number of the first light-emitting units 22 is approximately equal to the number of the second light-emitting units 23. The first light-emitting units 22 and the second light-emitting units 23 in a first row are arranged alternately in a first order, the first light-emitting units 22 and the second light-emitting units 23 in a second row are arranged alternately in a second order, and the first order is different from the second order. In this way, the first light-emitting units 22 and the second light-emitting units 23 in the first row and the first light-emitting units 22 and the second light-emitting units in the second row form a centrosymmetric structure. The rotation frequency of the light bars 2 is greater than or approximately equal to 10 Hz. Compared with the light bars 2 and the driving assembly 4 provided by the second embodiment of the present disclosure, the stability of the light bars 2 during the rotation in this embodiment is better, the rotation speed of the light bars 2 is slower, and the light-emitting uniformity of the display panel 200 is better.

In some embodiments, the rotation phase difference between the adjacent light bars 2 may not be ½π, as long as ensuring that the light bars 2 do not interfere with each other when the light bars 2 are rotating, and that the display panel 200 is capable to display properly.

Figure 9:
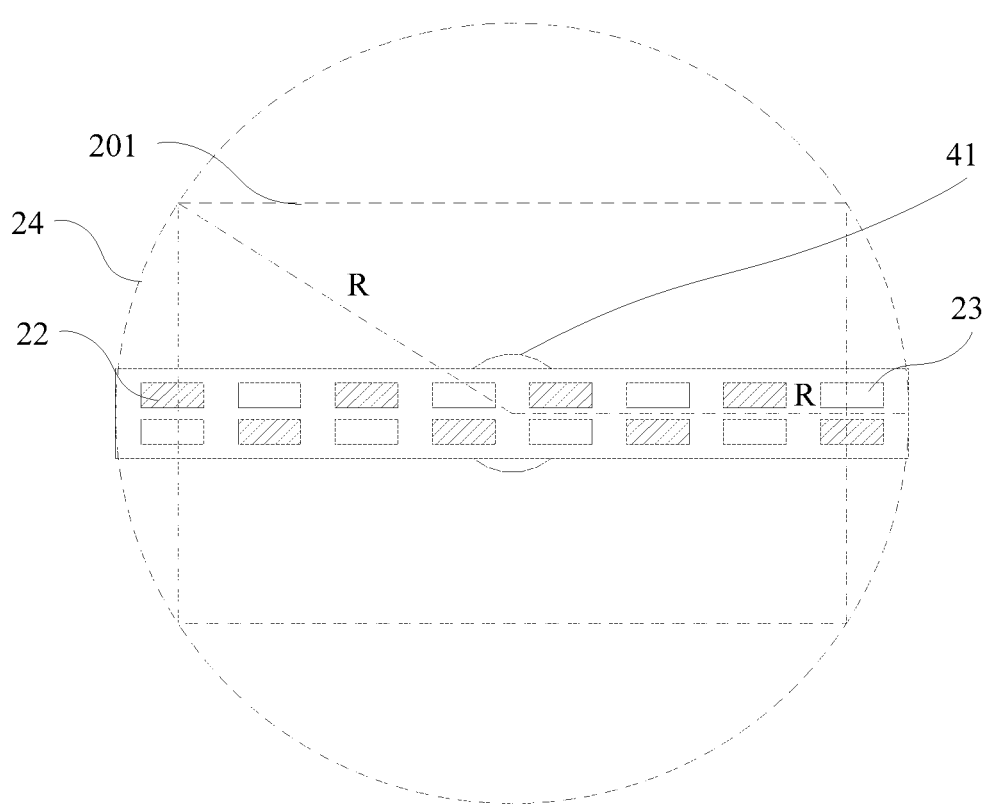
FIG. 9 is a schematic structural view illustrating a configuration of the light bar and the driving assembly provided by a fifth embodiment of the present disclosure.

As shown in FIG. 8 and FIG. 9, FIG. 9 is a schematic structural view illustrating a configuration of the light bar and the driving assembly provided by a fifth embodiment of the present disclosure.

The configuration of the light bar(s) 2 and the driving assembly 4 provided by the fifth embodiment of this disclosure is substantially the same as that of the light bar(s) 2 and the driving assembly 4 provided by the fourth embodiment of this disclosure, and the difference is that only one light bar 2 is provided in the fifth embodiment.

In the embodiments shown in FIG. 9, only one light bar 2 is provided, and the circular rotation area 24 of the light bar 2 covers the entire display area 201. In some embodiments, the display area 201 may be in shape of a rectangle, the center of the light bar 2 coincides with the center of the display area 201, the radius R of the circular rotation area 24 is half the length of the diagonal of the rectangle, the radius R of the circular rotation area 24 is half the length of the light bar 2. Compared with the light bar 2 and the driving assembly 4 provided by the fourth embodiment of the present disclosure, the arrangement of the light bar 2 in the fourth embodiment is simpler and the manufacturing process of the backlight module is simpler.

It should be noted that, some embodiments of the present disclosure only show some examples, but it does not mean that the arrangement of the light bars 2 is limited thereto.

Some embodiments of the present disclosure provide a backlight module 100. The backlight module 100 may include a back plate 1, a light bar 2, a dimming diaphragm 3, and a driving assembly 4. The back plate 1 may include a bottom plate 12. The light bar 2 may be arranged on one side of the bottom plate 12. The light bar 2 may include a circuit board 21, a plurality of first light-emitting units 22, and a plurality of second light-emitting units 23, and the plurality of first light-emitting units 22 and the plurality of second light-emitting units 23 are arranged on the circuit board 21. The dimming diaphragm 3 may be arranged on the side of the light bar 2 away from the bottom plate 12, and the dimming diaphragm 3 has a diffusion mode and a transparent mode. The driving assembly 4 may be arranged on the bottom plate 12, connected to the light bar 2, and configured to drive the light bar 2 to rotate. The first light-emitting unit 22 may be configured to generate diffuse light, and the second light-emitting unit 23 may be configured to generate collimated light. By arranging the first light-emitting units 22 that can generate diffuse light and the second light-emitting units 23 that can generate collimated light on the rotatable light bar 2, the positions of the first light-emitting units 22 and the second light-emitting units 23 may be changed continuously along with the rotation of the light bar 2 and the lighting conditions of the first light-emitting units 22 and the second light-emitting units 23 may be adjusted according to the modes of the dimming diaphragm 3. In this way, the area of the display panel 200 where the collimated light is transmitted to is changeable, and realize the local dynamic anti-peeping on the display panel 200. Besides, the use of privacy films and the power consumption of the light bar 2 are reduced.

Some embodiments of the present disclosure provide an anti-peeping display method for the display apparatus 500, and the display apparatus 500 is the above-mentioned display apparatus 500.

Figure 10:
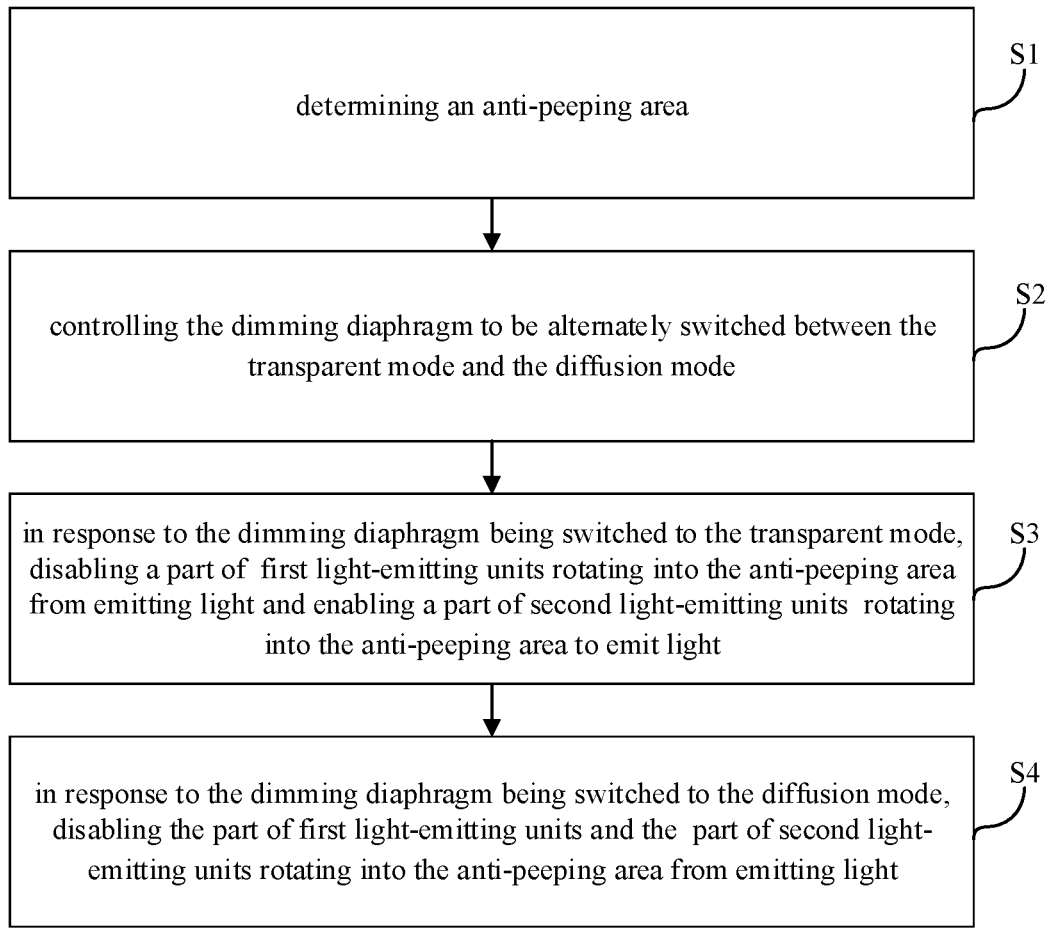
FIG. 10 is a schematic flow chart of an anti-peeping display method provided by some embodiments of the present disclosure.

As shown in FIG. 10, FIG. 10 is a schematic flow chart of an anti-peeping display method provided by some embodiments of the present disclosure.

The anti-peeping display method for the display apparatus 500 provided by some embodiments of the present disclosure may include the following operations.

In operation S1: the method includes determining an anti-peeping area.

In some embodiments, it is determined that only the collimated light is transmitted to at least part of the display area 201 of the display panel 200, and the at least part of display area 201 is configured as the anti-peeping area. The display picture in the anti-peeping area may be seen from the front-view angle (for example, the line of sight of a user may be substantially perpendicular to the display panel 200), but cannot be seen from other view angles, such as the large-viewing angles (for example, the line of sight of the user may be substantially parallel to the display panel 200).

In operation S2: the method includes controlling the dimming diaphragm to be alternately switched between the transparent mode and the diffusion mode.

In some embodiments, the dimming diaphragm 3 is controlled to be alternately switched between the transparent mode and the diffusion mode according to the anti-peeping requirement. In the transparent mode, only the collimated light is allowed to pass through the dimming diaphragm 3 and be transmitted to the display panel 200. In the diffusion mode, the diffuse light may pass through the dimming diaphragm 3 and be transmitted to the display panel 200. In the different modes of the dimming diaphragm 3, the light emitting conditions of the first light-emitting units 22 and the second light-emitting units 23 on the light bar(s) 2 rotating into the anti-peeping area are different from those on the light bar(s) 2 rotating outside the anti-peeping area. The light emitting conditions of the first light-emitting units 22 and the second light-emitting units 23 on the light bar(s) 2 match up the modes of the dimming diaphragm 3, so that the display picture in the anti-peeping area may be seen at the front-view angle, but cannot be seen from the other view angles, such as the large-viewing angles. The mode-switching speed of the dimming diaphragm 3 is related to the rotation frequency of the light bar(s) 2. The faster the light bar(s) 2 rotates, the faster the mode-switching speed of the dimming diaphragm 3.

In some embodiments, the plurality of first light-emitting units 22 and the plurality of second light-emitting units 23 of each light bar 2 are arranged in one row, and the numbers of the first light-emitting units 22 and the second light-emitting units 23 are substantially equal to each other. The rotation frequency of the light bar(s) 2 is greater than or substantially equal to 20 Hz. The modes of the dimming diaphragm 3 may be switched at least 20 times per second.

In some embodiments, the plurality of first light-emitting units 22 and the plurality of second light-emitting units 23 of each light bar 2 are arranged in two rows. The rotation frequency of the light bar(s) 2 is greater than or substantially equal to 10 Hz. The modes of the dimming diaphragm 3 may be switched at least 10 times per second.

The fewer rows the plurality of first light-emitting units 22 and the plurality of second light-emitting units 23 of each light bar 2 are arranged in, the faster the light bar(s) 2 rotates.

In operation S3: the method includes, in response to the dimming diaphragm being switched to the transparent mode, disabling the first light-emitting units which have rotated into the anti-peeping area from emitting light and enabling the second light-emitting units which have rotated into the anti-peeping area to emit light.

In some embodiments, in response to the dimming diaphragm being switched to the transparent mode, the first light-emitting units which have rotated into the anti-peeping area are disabled from emitting light and the second light-emitting units which have rotated into the anti-peeping area are enabled to emit light, so that the collimated light emitted by the second light-emitting units 23 can pass through the dimming diaphragm 3 and be transmitted to the display panel 200. The first light-emitting units 22 and/or the second light-emitting unit 23 (that is, at least one of the first light-emitting units 22 and the second light-emitting units 23) outside the anti-peeping area may emit light, or neither the first light-emitting unit 22 nor the second light-emitting unit 23 outside the anti-peeping area emit light. When the brightness of the display picture in the anti-peeping area is not enough, the first light-emitting units 22 and/or the second light-emitting units 23 (that is, at least one of the first light-emitting units 22 and the second light-emitting units 23) outside the anti-peeping area may emit light to increase the brightness of the display picture in the anti-peeping area.

In operation S4: the method includes, in response to the dimming diaphragm being switched to the diffusion mode, disabling the first light-emitting units and the second light-emitting units which have rotated into the anti-peeping area from emitting light.

In some embodiments, in response to the dimming diaphragm 3 being switched to the diffusion mode, the first light-emitting units and the second light-emitting units which have rotated into the anti-peeping area are disabled from emitting light. The first light-emitting units 22 and/or the second light-emitting units 23 (that is, at least one of the first light-emitting units 22 and the second light-emitting units 23) outside the anti-peeping area may emit light, or neither the first light-emitting units nor the second light-emitting units 23 outside the anti-peeping area emits light.

In some embodiments, the first light-emitting units 22 which have rotated into the non-display area 202 of the display panel 200 may be disabled from emitting light; and/or the second light-emitting units 23 rotated into the non-display area 202 of the display panel 200 may be disabled from emitting light. That is, at least one of the first light-emitting units 22 and the second light-emitting units 23 rotated into the non-display area 202 of the display panel 200 may be disabled from emitting light. The first light-emitting units 22 and the second light-emitting units 23 do not emit light in response to rotating out the display area 201 of the display panel 200, which may not only reduce the light emitted from the side, but also reduce the power consumption of the display apparatus 500.

It should be noted that, in the transparent mode, the first light-emitting units 22 outside the anti-peeping area do not emit light, and the second light-emitting units 23 emit light. In the diffusion mode, in response to the first light-emitting units 22 and the second light-emitting units 23 in the anti-peeping area neither emitting light, the entire display area 201 is the anti-peeping area. In the transparent mode and the anti-peeping mode (i.e. the diffusion mode), the first light-emitting units 22 and/or the second light-emitting units 23 (that is, at least one of the first light-emitting units 22 and the second light-emitting units 23) outside the anti-peeping area need to emit light, otherwise the picture of the display panel 200 cannot be displayed properly. Whether the dimming diaphragm 3 is switched to the transparent mode or the diffusion mode first is designed according to actual needs, and is not limited here.

In a first example, the anti-peeping area may be determined, and in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; neither the first light-emitting units 22 nor the second light-emitting units 23 outside the anti-peeping area is enabled to emit light. In response to the dimming diaphragm 3 being switched to the diffusion mode, the first light-emitting units 22 and the second light-emitting units 23 which have rotated into the anti-peeping area are disenabled from emitting light, and the first light-emitting units 22 and/or the second light-emitting units 23 (that is, at least one of the first light-emitting units 22 and the second light-emitting units 23) outside the anti-peeping area are enabled to emit light.

In a second example, the anti-peeping area may be determined, in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; the first light-emitting units 22 outside the anti-peeping area are enabled to emit light or both the first light-emitting units 22 and the second light-emitting units 23 outside the anti-peeping area are enabled to emit light. In response to the dimming diaphragm 3 being switched to the diffusion mode, the first light-emitting units 22 and the second light-emitting units 23 which have rotated into the anti-peeping area are disenabled from emitting light, and the first light-emitting units 22 and the second light-emitting units 23 outside or beyond the anti-peeping area are disenabled from emitting light.

In a third example, the anti-peeping area may be determined, in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; the first light-emitting units 22 and/or the second light-emitting units 23 (that is, at least one of the first light-emitting units 22 and the second light-emitting units 23) outside the anti-peeping area are enabled to emit light. In response to the dimming diaphragm 3 being switched to the diffusion mode, the first light-emitting units 22 and the second light-emitting units 23 which have rotated into the anti-peeping area are disabled from emitting light, and the first light-emitting units 22 and/or the second light-emitting units 23 (that is, at least one of the first light-emitting units 22 and the second light-emitting units 23) outside the anti-peeping area are enabled to emit light.

Some embodiments of the present disclosure provide an anti-peeping display method for the display apparatus 500. The anti-peeping display method includes: determining an anti-peeping area; controlling the dimming diaphragm 3 to be alternately switched between the transparent mode and the diffusion mode; in response to the dimming diaphragm 3 being switched to the transparent mode, disabling the first light-emitting units 22 which have rotated into the anti-peeping area from emitting light and enabling the second light-emitting units 23 which have rotated into the anti-peeping area to emit light; in response to the dimming diaphragm 3 being switched to the diffusion mode, disabling the first light-emitting units 22 and the second light-emitting units 23 which have rotated into the anti-peeping area from emitting light. In different modes of the dimming diaphragm 3, the positions of the first light-emitting units 22 and the second light-emitting units 23 are continuously changed and the light-emitting conditions of the first light-emitting units 22 and the second light-emitting units 23 are continuously adjusted as the light bar(s) 2 rotate(s), so that the area of the display panel 200 where the collimated light is transmitted to is changeable, so as to realize the local dynamic anti-peeping of the display panel 200.

Figure 11:
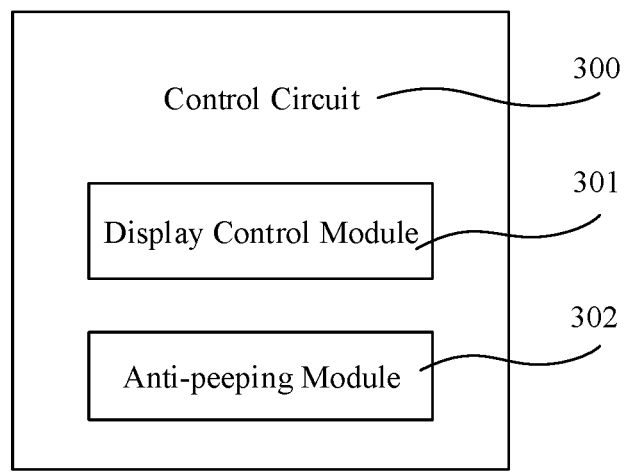
FIG. 11 is a schematic block diagram of a control circuit provided by some embodiments of the present disclosure.

As shown in FIG. 11, FIG. 11 is a schematic block diagram of a control circuit provided by some embodiments of the present disclosure.

Some embodiments of the present disclosure provide a control circuit 300 for the display apparatus 500 to realize anti-peeping display. The display apparatus 500 is the above-mentioned display apparatus 500. The control circuit 300 may be configured to implement the above-mentioned anti-peeping display method.

The control circuit 300 includes a display control module 301 and an anti-peeping module 302. The display control module 301 may be configured to receive an image signal, and control the display panel 200 to display images according to the image signal.

The anti-peeping module 302 may be configured to receive an anti-peeping signal and determine the anti-peeping area. The anti-peeping module 302 may also be configured to enable the dimming diaphragm 3 to be alternately switched between the transparent mode and the diffusion mode, and to enable the corresponding first light-emitting units 22 and second light-emitting units 23 inside and outside the anti-peeping area to emit light according to the mode of the dimming diaphragm 3.

In a first example, the anti-peeping module 302 may determine the anti-peeping area first, and then in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; neither the first light-emitting units 22 nor the second light-emitting units 23 outside the anti-peeping area is enabled to emit light. In response to the dimming diaphragm 3 being switched to the diffusion mode, the first light-emitting units 22 and the second light-emitting units 23 which have rotated into the anti-peeping area are disabled from emitting light, and the first light-emitting units 22 and/or the second light-emitting units 23 (that is, at least one of the first light-emitting units 22 and the second light-emitting units 23) outside the anti-peeping area are enable to emit light.

In a second example, the anti-peeping module 302 may determine the anti-peeping area first, in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; the first light-emitting units 22 outside the anti-peeping area are enabled to emit light or both the first light-emitting units 22 and the second light-emitting units 23 outside the anti-peeping area are enabled to emit light. In response to the dimming diaphragm 3 being switched to the diffusion mode, the first light-emitting units 22 and the second light-emitting units 23 which have rotated into the anti-peeping area are disabled from emitting light; the first light-emitting units 22 and the second light-emitting units 23 outside or beyond the anti-peeping area are disenabled from emitting light.

In a third example, the anti-peeping module 302 may determine the anti-peeping area first, in response to the dimming diaphragm being switched to the transparent mode, the first light-emitting units 22 which have rotated into the anti-peeping area are disabled from emitting light and the second light-emitting unit 23 which have rotated into the anti-peeping area are enabled to emit light; and the first light-emitting units 22 and/or the second light-emitting units 23 (that is, at least one of the first light-emitting units 22 and the second light-emitting units 23) outside the anti-peeping area are enabled to emit light. In response to the dimming diaphragm 3 being switched to the diffusion mode, the first light-emitting units 22 and the second light-emitting units 23 which have rotated into the anti-peeping area are disabled from emitting light; the first light-emitting units 22 and/or the second light-emitting units 23 (that is, at least one of the first light-emitting units 22 and the second light-emitting units 23) outside the anti-peeping area are enabled to emit light.

In some embodiments, the anti-peeping module 302 may also be configured to disable the first light-emitting units 22 that rotate into the non-display area 202 of the display panel 200 from emitting light and disable the second light-emitting units that rotate into the non-display area 202 of the display panel 200 from emitting light. In response to rotating out the display area 201 of the display panel 200, the first light-emitting units 22 and the second light-emitting units 23 stop emitting light, which may not only reduce the light emitted from the side, but also reduces the power consumption of the display apparatus 500. In other embodiments, the anti-peeping module 302 may be configured to disable the first light-emitting units 22 which have rotated into the non-display area 202 of the display panel 200 from emitting light, or to disable the second light-emitting units 22 which have rotated into the non-display area 202 of the display panel 200 from emitting light.

Figure 12:
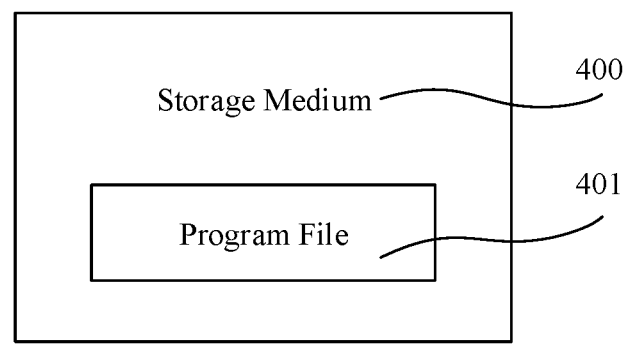
FIG. 12 is a schematic block diagram of a storage medium provided by some embodiments of the present disclosure.

As shown in FIG. 12, FIG. 12 is a schematic block diagram of a storage medium provided by some embodiments of the present disclosure.

Some embodiments of the present disclosure further provide a storage medium 400. The storage medium 400 stores a program file 401, and the program file 401 may be executed to perform the above-mentioned anti-peeping display method for the display apparatus 500, so that the display apparatus 500 may realize local dynamic anti-peeping. The program file 401 may be stored in the storage medium 400 in a form of a software product, including several instructions to enable a computer device (which may be a personal computer, server, or network device, etc.) or a processor to execute all or part of the operations of the methods in some embodiments of the present disclosure. The aforementioned storage medium may include: a USB drive, a portable hard drive, a read-only memory (ROM), a random access memory (RAM), a tape, an optical disk, or other medium that is capable to store program codes, or a terminal device such as a computer, a server, a mobile phone, a tablet, or the like.

A first technical solution adopted by the present disclosure is to provide an anti-peeping display method for a display apparatus. The display apparatus includes a display panel and a backlight module. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate; wherein, the anti-peeping display method includes: determining an anti-peeping area; controlling the dimming diaphragm to be alternately switched between the transparent mode and the diffusion mode; in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light.

In some embodiments, the anti-peeping display method further includes: in response to the dimming diaphragm being switched to the transparent mode, disabling a part of the first light-emitting units outside the anti-peeping area and a part of the second light-emitting units outside the anti-peeping area from emitting light, and in response to the dimming diaphragm being switched to the diffusion mode, enabling at least one selected from the group consisting of the part of the first light-emitting units outside the anti-peeping area and the part of the second light-emitting units outside the anti-peeping area to emit light.

In some embodiments, in response to the dimming diaphragm being switched to the transparent mode, enabling the part of the first light-emitting units outside the anti-peeping area to emit light, or enabling the part of the first light-emitting units outside the anti-peeping area and the part of the second light-emitting units outside the anti-peeping area to emit light, and in response to the dimming diaphragm being switched to the diffusion mode, disabling the part of the first light-emitting units outside the anti-peeping area and the part of the second light-emitting units outside the anti-peeping area from emitting light.

In some embodiments, in response to the dimming diaphragm being switched to the transparent mode, enabling the part of the first light-emitting units outside the anti-peeping area and/or the part of the second light-emitting units outside the anti-peeping area to emit light, and in response to the dimming diaphragm being switched to the diffusion mode, enabling at least one selected from the group consisting of the part of the first light-emitting units outside the anti-peeping area and the second light-emitting unit outside the anti-peeping area to emit light.

In some embodiments, the anti-peeping display method further includes at least one of: disabling a part of the first light-emitting units rotating into a non-display area of the display panel from emitting light; and disabling a part of the second light-emitting units rotating into a non-display area of the display panel from emitting light.

In some embodiments, the in response to the dimming diaphragm being switched to the transparent mode, disabling a part of the first light-emitting units rotating into the anti-peeping area from emitting light and enabling a part of the second light-emitting units rotating into the anti-peeping area to emit light includes: in response to the dimming diaphragm being switched to the transparent mode, enabling the part of the first light-emitting units rotating into the anti-peeping area and the part of the second light-emitting units rotating into the anti-peeping area to emit light; and enabling at least one selected from the group consisting of the part of the first light-emitting units outside the anti-peeping area and the part of the second light-emitting units outside the anti-peeping area to emit light, or disabling at least one selected from the group consisting of the part of the first light-emitting units outside the anti-peeping area and the part of the second light-emitting units outside the anti-peeping area from emitting light.

In some embodiments, the in response to the dimming diaphragm being switched to the diffusion mode, disabling the part of the first light-emitting units rotating into the anti-peeping area and the part of the second light-emitting units rotating into the anti-peeping area from emitting light includes: in response to the dimming diaphragm being switched to the diffusion mode, disabling the part of the first light-emitting units rotating into the anti-peeping area and the part of the second light-emitting units rotating into the anti-peeping area from emitting light; and enabling at least one selected from the group consisting of the part of the first light-emitting units outside the anti-peeping area and the part of the second light-emitting units outside the anti-peeping area to emit light, or disabling at least one selected from the group consisting of the part of the first light-emitting units outside the anti-peeping area and the part of the second light-emitting units outside the anti-peeping area from emitting light.

A second technical solution adopted by the present disclosure is to provide a control circuit for implementing anti-peeping display of a display apparatus. The display apparatus includes a display panel and a backlight module. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate; the control circuit including: a display control module, configured to receive an image signal and control the display panel to display an image according to the image signal; wherein, the control circuit further includes: an anti-peeping module, configured to perform following operations: receiving an anti-peeping signal, and determining an anti-peeping area; controlling the dimming diaphragm to be alternately switched between the transparent mode and the diffusion mode; in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light.

In some embodiments, the anti-peeping module is further configured to perform a following operation: in response to the dimming diaphragm being switched to the transparent mode, disabling a part of the first light-emitting units outside the anti-peeping area and a part of the second light-emitting units outside the anti-peeping area from emitting light, and in response to the dimming diaphragm being switched to the diffusion mode, enabling at least one selected from the group consisting of the part of the first light-emitting units outside the anti-peeping area and the part of the second light-emitting units outside the anti-peeping area to emit light.

In some embodiments, the anti-peeping module is further configured to perform a following operation: in response to the dimming diaphragm being switched to the transparent mode, enabling the part of the first light-emitting units outside the anti-peeping area to emit light, or enabling the part of the first light-emitting units outside the anti-peeping area and the part of the second light-emitting units outside the anti-peeping area to emit light, and in response to the dimming diaphragm being switched to the diffusion mode, disabling the part of the first light-emitting units outside the anti-peeping area and the part of the second light-emitting units outside the anti-peeping area from emitting light.

In some embodiments, the anti-peeping module is further configured to perform a following operation: in response to the dimming diaphragm being switched to the transparent mode, enabling the part of the first light-emitting units outside the anti-peeping area and/or the part of the second light-emitting units outside the anti-peeping area to emit light, and in response to the dimming diaphragm being switched to the diffusion mode, enabling at least one selected from the group consisting of the part of the first light-emitting units outside the anti-peeping area and the second light-emitting unit outside the anti-peeping area to emit light.

In some embodiments, the anti-peeping module is further configured to perform at least one of following operations: disabling a part of the first light-emitting units rotating into a non-display area of the display panel from emitting light; and disabling a part of the second light-emitting units rotating into a non-display area of the display panel from emitting light.

A third technical solution adopted by the present disclosure is to provide a display apparatus, including: a display panel, a backlight module, and the above-mentioned control circuit. The backlight module includes: a back plate, including a bottom plate; one or more light bars, arranged on a side of the bottom plate, each of the one or more light bars includes: a circuit board; a plurality of first light-emitting units, arranged on the circuit board, and configured to generate diffuse light; and a plurality of second light-emitting units, arranged on the circuit board, and configured to generate collimated light; a dimming diaphragm, arranged on a side of the one or more light bars away from the bottom plate, and having a diffusion mode and a transparent mode; and a driving assembly, arranged on the bottom plate, connected to the light bar, and configured to drive the light bar to rotate. The control circuit being configured to implement anti-peeping display of the display apparatus, and including: a display control module, configured to receive an image signal and control the display panel to display an image according to the image signal; the control circuit further includes: an anti-peeping module, configured to perform following operations: receiving an anti-peeping signal, and determining an anti-peeping area; controlling the dimming diaphragm to be alternately switched between the transparent mode and the diffusion mode; in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light. In some embodiments, the driving assembly is configured to drive the one or more light bars to rotate around a center of each of the one or more light bars to form a circular rotation area, circular rotating regions of two adjacent light bars of the one or more light bars partially overlap with each other, rotation phases of the two adjacent light bars are out of synchronization and free of mutual interference; and the display panel includes a display area, the one or more light bars include a plurality of light bars, the plurality of light bars are rotatable around centers of the plurality of light bars, respectively, to form a plurality of circular rotation areas, and the plurality of circular rotation areas of the plurality of light bars jointly cover the entire display area of the display panel.

In some embodiments, the display area is in the shape of a rectangle, and a distance, between a center of one light bar at a corner of the rectangle and the vertex at the corresponding corner of the rectangle, is equal to a radius of each of the plurality of circular rotation areas.

In some embodiments, the entire of the display area forms the anti-peeping area; in response to the dimming diaphragm being in the diffusion mode, the first light-emitting units outside the anti-peeping area are disabled from emitting light and the second light-emitting units outside the anti-peeping area are enabled to emit light; and in response to the dimming diaphragm being in the diffusion mode, both the first light-emitting and the second light-emitting units inside the anti-peeping area units are disabled from emitting light.

In some embodiments, the first light-emitting units outside the anti-peeping area, or the second light-emitting units outside the anti-peeping area, or both the first light-emitting units and the second light-emitting units outside the anti-peeping area are capable of emitting light.

In some embodiments, the plurality of first light-emitting units and the plurality of second light-emitting units of each light bar are arranged in one row, the rotation frequency of the light bar is greater than or substantially equal to 20 Hz, and the modes of the dimming diaphragm are configured to be switched at least 20 times per second; or the plurality of first light-emitting units and the plurality of second light-emitting units of each light bar are arranged in two rows, the rotation frequency of the light bar is greater than or substantially equal to 10 Hz, and the modes of the dimming diaphragm are configured to be switched at least 10 times per second.

In some embodiments, the backlight module is a direct backlight module, the display panel includes a display area, the one or more light bars includes one light bar, the light bar is rotatable around a center of the light bar to form a circular rotation area, and the circular rotation area is capable of covering the entire display area.

In some embodiments, the display area is in shape of a rectangle, the center of the light bar coincides with a center of the display area, a radius of the circular rotation area is half the length of the diagonal of the rectangle and half the length of the light bar.

The above illustrates only the embodiments of the disclosure, and does not limit the protection scope of the present disclosure. Any equivalent structure or equivalent process conversion made by using the description and drawings of the present disclosure, or directly or indirectly used in other related technical fields, are all included in the protection scope of the present disclosure in the same way.

What is claimed is:

1. An anti-peeping display method for a display apparatus, the display apparatus comprising a display panel and a backlight module, and the backlight module comprising:
    a back plate, comprising a bottom plate;
    one or more light bars, arranged on a side of the bottom plate, wherein each of the one or more light bars comprises:
        a circuit board;
        a plurality of first light-emitting units, arranged on the circuit board, and configured to generate diffuse light; and
        a plurality of second light-emitting units, arranged on the circuit board, and configured to generate collimated light;
    a dimming diaphragm, arranged on a side of the one or more light bars away from the bottom plate, and having a diffusion mode and a transparent mode; and
    a driving assembly, arranged on the bottom plate, connected to at least one of the one or more light bars, and configured to drive the light bar to rotate;
    wherein, the anti-peeping display method comprises:
    determining, by an anti-peeping module, an anti-peeping area;
    controlling, by the anti-peeping module, the dimming diaphragm to be alternately switched between the transparent mode and the diffusion mode;
    in response to the dimming diaphragm being switched to the transparent mode, disabling, by the anti-peeping module, a part of the first light-emitting units rotating into the anti-peeping area from emitting light and enabling, by the anti-peeping module, a part of the second light-emitting units rotating into the anti-peeping area to emit light; and
    in response to the dimming diaphragm being switched to the diffusion mode, disabling, by the anti-peeping module, the part of the first light-emitting units rotating into the anti-peeping area and the part of the second light-emitting units rotating into the anti-peeping area from emitting light.

2. The anti-peeping display method according to claim 1, further comprising:
    in response to the dimming diaphragm being switched to the transparent mode, disabling, by the anti-peeping module, a part of the first light-emitting units outside the anti-peeping area and a part of the second light-emitting units outside the anti-peeping area from emitting light, and in response to the dimming diaphragm being switched to the diffusion mode, enabling, by the anti-peeping module, at least one selected from the group consisting of the part of the first light-emitting units outside the anti-peeping area and the part of the second light-emitting units outside the anti-peeping area to emit light.

3. The anti-peeping display method according to claim 1, further comprising:
    in response to the dimming diaphragm being switched to the transparent mode, enabling, by the anti-peeping module, the part of the first light-emitting units outside the anti-peeping area to emit light, or enabling, by the anti-peeping module, the part of the first light-emitting units outside the anti-peeping area and the part of the second light-emitting units outside the anti-peeping area to emit light, and in response to the dimming diaphragm being switched to the diffusion mode, disabling, by the anti-peeping module, the part of the first light-emitting units outside the anti-peeping area and the part of the second light-emitting units outside the anti-peeping area from emitting light.

4. The anti-peeping display method according to claim 1, further comprising:
    in response to the dimming diaphragm being switched to the transparent mode, enabling, by the anti-peeping module, the part of the first light-emitting units outside the anti-peeping area and/or the part of the second light-emitting units outside the anti-peeping area to emit light, and in response to the dimming diaphragm being switched to the diffusion mode, enabling, by the anti-peeping module, at least one selected from the group consisting of the part of the first light-emitting units outside the anti-peeping area and the second light-emitting unit outside the anti-peeping area to emit light.

5. The anti-peeping display method according to claim 1, further comprising at least one of:
    disabling, by the anti-peeping module, a part of the first light-emitting units rotating into a non-display area of the display panel from emitting light; and
    disabling, by the anti-peeping module, a part of the second light-emitting units rotating into a non-display area of the display panel from emitting light.

6. The anti-peeping display method according to claim 1, wherein the in response to the dimming diaphragm being switched to the transparent mode, disabling, by the anti-peeping module, a part of the first light-emitting units rotating into the anti-peeping area from emitting light and enabling a part of the second light-emitting units rotating into the anti-peeping area to emit light comprises:

in response to the dimming diaphragm being switched to the transparent mode, enabling, by the anti-peeping module, the part of the first light-emitting units rotating into the anti-peeping area and the part of the second light-emitting units rotating into the anti-peeping area to emit light; and enabling, by the anti-peeping module, at least one selected from the group consisting of the part of the first light-emitting units outside the anti-peeping area and the part of the second light-emitting units outside the anti-peeping area to emit light, or disabling, by the anti-peeping module, at least one selected from the group consisting of the part of the first light-emitting units outside the anti-peeping area and the part of the second light-emitting units outside the anti-peeping area from emitting light.

7. The anti-peeping display method according to claim 1, wherein the in response to the dimming diaphragm being switched to the diffusion mode, disabling, by the anti-peeping module, the part of the first light-emitting units rotating into the anti-peeping area and the part of the second light-emitting units rotating into the anti-peeping area from emitting light comprises:

in response to the dimming diaphragm being switched to the diffusion mode, disabling, by the anti-peeping module, the part of the first light-emitting units rotating into the anti-peeping area and the part of the second light-emitting units rotating into the anti-peeping area from emitting light; and enabling, by the anti-peeping module, at least one selected from the group consisting of the part of the first light-emitting units outside the anti-peeping area and the part of the second light-emitting units outside the anti-peeping area to emit light, or disabling, by the anti-peeping module, at least one selected from the group consisting of the part of the first light-emitting units outside the anti-peeping area and the part of the second light-emitting units outside the anti-peeping area from emitting light.

8. A control circuit for implementing anti-peeping display of a display apparatus, the display apparatus comprising a display panel and a backlight module, and the backlight module comprising:

a back plate, comprising a bottom plate;

one or more light bars, arranged on a side of the bottom plate, wherein each of the one or more light bars comprises:

a circuit board;

a plurality of first light-emitting units, arranged on the circuit board, and configured to generate diffuse light; and a plurality of second light-emitting units, arranged on the circuit board, and configured to generate collimated light;

a dimming diaphragm, arranged on a side of the one or more light bars away from the bottom plate, and having a diffusion mode and a transparent mode; and a driving assembly, arranged on the bottom plate, connected to at least one of the one or more light bars, and configured to drive the light bar to rotate;

the control circuit comprising: a display control module, configured to receive an image signal and control the display panel to display an image according to the image signal;

wherein, the control circuit further comprises: an anti-peeping module, configured to perform following operations:

receiving an anti-peeping signal, and determining an anti-peeping area;

controlling the dimming diaphragm to be alternately switched between the transparent mode and the diffusion mode;

in response to the dimming diaphragm being switched to the transparent mode, disabling a part of the first light-emitting units rotating into the anti-peeping area from emitting light and enabling a part of the second light-emitting units rotating into the anti-peeping area to emit light; and in response to the dimming diaphragm being switched to the diffusion mode, disabling the part of the first light-emitting units rotating into the anti-peeping area and the part of the second light-emitting units rotating into the anti-peeping area from emitting light.

9. The control circuit according to claim 8, wherein the anti-peeping module is further configured to perform a following operation:

in response to the dimming diaphragm being switched to the transparent mode, disabling a part of the first light-emitting units outside the anti-peeping area and a part of the second light-emitting units outside the anti-peeping area from emitting light, and in response to the dimming diaphragm being switched to the diffusion mode, enabling at least one selected from the group consisting of the part of the first light-emitting units outside the anti-peeping area and the part of the second light-emitting units outside the anti-peeping area to emit light.

10. The control circuit according to claim 8, wherein the anti-peeping module is further configured to perform a following operation:

in response to the dimming diaphragm being switched to the transparent mode, enabling the part of the first light-emitting units outside the anti-peeping area to emit light, or enabling the part of the first light-emitting units outside the anti-peeping area and the part of the second light-emitting units outside the anti-peeping area to emit light, and in response to the dimming diaphragm being switched to the diffusion mode, disabling the part of the first light-emitting units outside the anti-peeping area and the part of the second light-emitting units outside the anti-peeping area from emitting light.

11. The control circuit according to claim 8, wherein the anti-peeping module is further configured to perform a following operation:

in response to the dimming diaphragm being switched to the transparent mode, enabling the part of the first light-emitting units outside the anti-peeping area and/or the part of the second light-emitting units outside the anti-peeping area to emit light, and in response to the dimming diaphragm being switched to the diffusion mode, enabling at least one selected from the group consisting of the part of the first light-emitting units outside the anti-peeping area and the second light-emitting unit outside the anti-peeping area to emit light.

12. The control circuit according to claim 8, wherein the anti-peeping module is further configured to perform at least one of following operations:

disabling a part of the first light-emitting units rotating into a non-display area of the display panel from emitting light; and disabling a part of the second light-emitting units rotating into a non-display area of the display panel from emitting light.

13. A display apparatus, comprising:
a display panel, a backlight module, and a control circuit; and
wherein the backlight module comprises:
a back plate, comprising a bottom plate;
one or more light bars, arranged on a side of the bottom plate, wherein each of the one or more light bars comprises:
  a circuit board;
  a plurality of first light-emitting units, arranged on the circuit board, and configured to generate diffuse light; and
  a plurality of second light-emitting units, arranged on the circuit board, and configured to generate collimated light;
a dimming diaphragm, arranged on a side of the one or more light bars away from the bottom plate, and having a diffusion mode and a transparent mode; and
a driving assembly, arranged on the bottom plate, connected to at least one of the one or more light bars, and configured to drive the light bar to rotate;
the control circuit being configured to implement anti-peeping display of the display apparatus, and comprising: a display control module, configured to receive an image signal and control the display panel to display an image according to the image signal;
wherein the control circuit further comprises: an anti-peeping module, configured to perform following operations:
receiving an anti-peeping signal, and determining an anti-peeping area;
controlling the dimming diaphragm to be alternately switched between the transparent mode and the diffusion mode;
in response to the dimming diaphragm being switched to the transparent mode, disabling a part of the first light-emitting units rotating into the anti-peeping area from emitting light and enabling a part of the second light-emitting units rotating into the anti-peeping area to emit light; and
in response to the dimming diaphragm being switched to the diffusion mode, disabling the part of the first light-emitting units rotating into the anti-peeping area and the part of the second light-emitting units rotating into the anti-peeping area from emitting light.

14. The display apparatus according to claim 13, wherein the driving assembly is configured to drive the one or more light bars to rotate around a center of each of the one or more light bars to form a circular rotation area, circular rotating regions of two adjacent light bars of the one or more light bars partially overlap with each other, rotation phases of the two adjacent light bars are out of synchronization and free of mutual interference; and the display panel comprises a display area, the one or more light bars comprise a plurality of light bars, the plurality of light bars are rotatable around centers of the plurality of light bars, respectively, to form a plurality of circular rotation areas, and the plurality of circular rotation areas of the plurality of light bars jointly cover the entire display area of the display panel.

15. The display apparatus according to claim 14, wherein the display area is in the shape of a rectangle, and a distance, between a center of one light bar at a corner of the rectangle and the vertex at the corresponding corner of the rectangle, is equal to a radius of each of the plurality of circular rotation areas.

16. The display apparatus according to claim 14, wherein the entire of the display area forms the anti-peeping area;
  in response to the dimming diaphragm being in the diffusion mode, the first light-emitting units outside the anti-peeping area are disabled from emitting light and the second light-emitting units outside the anti-peeping area are enabled to emit light; and
  in response to the dimming diaphragm being in the diffusion mode, both the first light-emitting and the second light-emitting units inside the anti-peeping area units are disabled from emitting light.

17. The display apparatus according to claim 13, wherein the first light-emitting units outside the anti-peeping area, or the second light-emitting units outside the anti-peeping area, or both the first light-emitting units and the second light-emitting units outside the anti-peeping area are capable of emitting light.

18. The display apparatus according to claim 13, wherein the plurality of first light-emitting units and the plurality of second light-emitting units of each light bar are arranged in one row, the rotation frequency of the light bar is greater than or substantially equal to 20 Hz, and the modes of the dimming diaphragm are configured to be switched at least 20 times per second; or
  the plurality of first light-emitting units and the plurality of second light-emitting units of each light bar are arranged in two rows, the rotation frequency of the light bar is greater than or substantially equal to 10 Hz, and the modes of the dimming diaphragm are configured to be switched at least 10 times per second.

19. The display apparatus according to claim 13, wherein the backlight module is a direct backlight module, the display panel comprises a display area, the one or more light bars comprises one light bar, the light bar is rotatable around a center of the light bar to form a circular rotation area, and the circular rotation area is capable of covering the entire display area.

20. The display apparatus according to claim 19, wherein the display area is in shape of a rectangle, the center of the light bar coincides with a center of the display area, a radius of the circular rotation area is half the length of the diagonal of the rectangle and half the length of the light bar.

* * * * *